(12) United States Patent
Day

(10) Patent No.: US 10,077,711 B2
(45) Date of Patent: Sep. 18, 2018

(54) PNEUMATIC ACTUATOR HAVING A PRESSURE RELIEF WINDOW

(71) Applicant: BorgWarner Inc., Auburn Hills, MI (US)

(72) Inventor: Andrew Day, Huddersfield (GB)

(73) Assignee: BorgWarner Inc., Auburn Hills, MI (US)

( * ) Notice: Subject to any disclaimer, the term of this patent is extended or adjusted under 35 U.S.C. 154(b) by 180 days.

(21) Appl. No.: 14/898,177

(22) PCT Filed: Jun. 23, 2014

(86) PCT No.: PCT/US2014/043620
§ 371 (c)(1),
(2) Date: Dec. 14, 2015

(87) PCT Pub. No.: WO2014/209862
PCT Pub. Date: Dec. 31, 2014

(65) Prior Publication Data
US 2016/0131023 A1    May 12, 2016

Related U.S. Application Data

(60) Provisional application No. 61/840,828, filed on Jun. 28, 2013.

(51) Int. Cl.
*F15B 20/00* (2006.01)
*F02B 37/18* (2006.01)

(52) U.S. Cl.
CPC .......... *F02B 37/186* (2013.01); *F15B 20/007* (2013.01); *Y02T 10/144* (2013.01)

(58) Field of Classification Search
CPC ..................................................... F15B 20/007
See application file for complete search history.

(56) References Cited

U.S. PATENT DOCUMENTS

| | | | |
|---|---|---|---|
| 6,810,915 B2 * | 11/2004 | Umetsu | F15B 1/103 137/68.11 |
| 2003/0164089 A1 | 9/2003 | Hosny | |
| 2010/0122735 A1 | 5/2010 | Schramm et al. | |
| 2011/0266834 A1 * | 11/2011 | Beumer | B62D 21/15 296/190.05 |
| 2012/0060495 A1 | 3/2012 | Jacob | |

FOREIGN PATENT DOCUMENTS

| KR | 1020010066001 | 7/2001 |
|---|---|---|
| KR | 1020030029682 | 4/2003 |

* cited by examiner

*Primary Examiner* — F. Daniel Lopez
(74) *Attorney, Agent, or Firm* — Young Basile Hanlon & MacFarlane, P.C.

(57) ABSTRACT

A pneumatic actuator (1) includes a housing (22) having a first portion (23), a second portion (25), and a fluid inlet (2) formed in the first portion (23). The actuator (1) includes a diaphragm (6) disposed in the housing (22), a piston (7) connected to the diaphragm (6), and a spring (10) that extends between the piston (7) and the housing second portion (25). A pressurized chamber (3) is defined between the diaphragm (6) and the housing first portion (23), and the housing first portion (23) includes a pressure relief device (8).

20 Claims, 4 Drawing Sheets

PNEUMATIC ACTUATOR HAVING A PRESSURE RELIEF WINDOW

CROSS-REFERENCE TO RELATED APPLICATIONS

This application claims priority to and all benefits of U.S. Provisional Application No. 61/840,828, filed on Jun. 28, 2013, and entitled "A Pneumatic Actuator Having A Pressure Relief Window."

BACKGROUND

1. Field of the Invention

This invention relates to a pneumatic actuator which may be used with a turbocharger or in other applications where actuators are used including applications where actuators are used to control valves. More particularly, this invention relates to a pneumatic actuator having a pressure relief section.

2. Description of Related Art

A turbocharger is a type of forced induction system used with internal combustion engines. Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, naturally aspirated engines. Using a smaller engine in a vehicle has the desirable effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

SUMMARY

In some aspects, a pneumatic actuator includes a housing having a housing first portion, a housing second portion, and a fluid inlet formed in the housing first portion. The actuator includes a diaphragm disposed in the housing and extending between opposed faces of the housing, a piston disposed in the housing, the piston connected to the diaphragm, and a spring disposed in the housing and extending between the piston and the housing second portion. A pressurized chamber is defined between the diaphragm and the housing first portion, and the housing first portion includes a pressure relief device.

The pneumatic actuator may include one or more of the following features: The pressure relief device comprises a weakened portion of the housing first portion. The pressure relief device comprises a portion of the housing first portion that is weakened by score marks. The pressure relief device comprises a portion of the housing first portion that is thin relative to the remainder of the housing first portion. The pressure relief device comprises a portion of the housing first portion that includes a rupture disc. The rupture disc is retained within the housing first portion by a retaining ring. The rupture disc is surrounded by a protective duct. The pressure relief device is a pressure relief valve. The pressure relief device is formed of metal. The metal is selected from the group consisting of aluminum, brass, steel, stainless steel, steel sheet metal, and stainless steel sheet metal. The pressure relief device is formed of a plastic. The plastic is selected from the group consisting of polyamide resins, acrylonitrile resins, butadiene styrene resins, polycarbonate resins, polyether ether ketone resins, polyetherimide resins, phenol formaldehyde resins, and urea formaldehyde resins.

A turbocharger wastegate actuator includes features for lessening the likelihood of damaging actuator rupture if high pressure air accidently gets sent to the actuator. The wall of the actuator has a pressure relief section which ruptures in a controlled manner if high pressure air accidently gets sent to the actuator. The pressure relief section may be a weakened section of the wall which is able to withstand the ordinary pressures to which an actuator is subjected, but ruptures in a controlled manner at higher pressures. The wall may be weakened by having score marks, by being a thinned section of the wall or by having a rupture disc in the wall. This weakened section of the wall provides a point of controlled rupture. In some cases, the rupture disc may be replaced if the actuator is damaged by high pressure air.

BRIEF DESCRIPTION OF THE DRAWINGS

Advantages of the actuator will be readily appreciated as the same becomes better understood by reference to the following detailed description when considered in connection with the accompanying drawings wherein.

DETAILED DESCRIPTION

Figure 1:
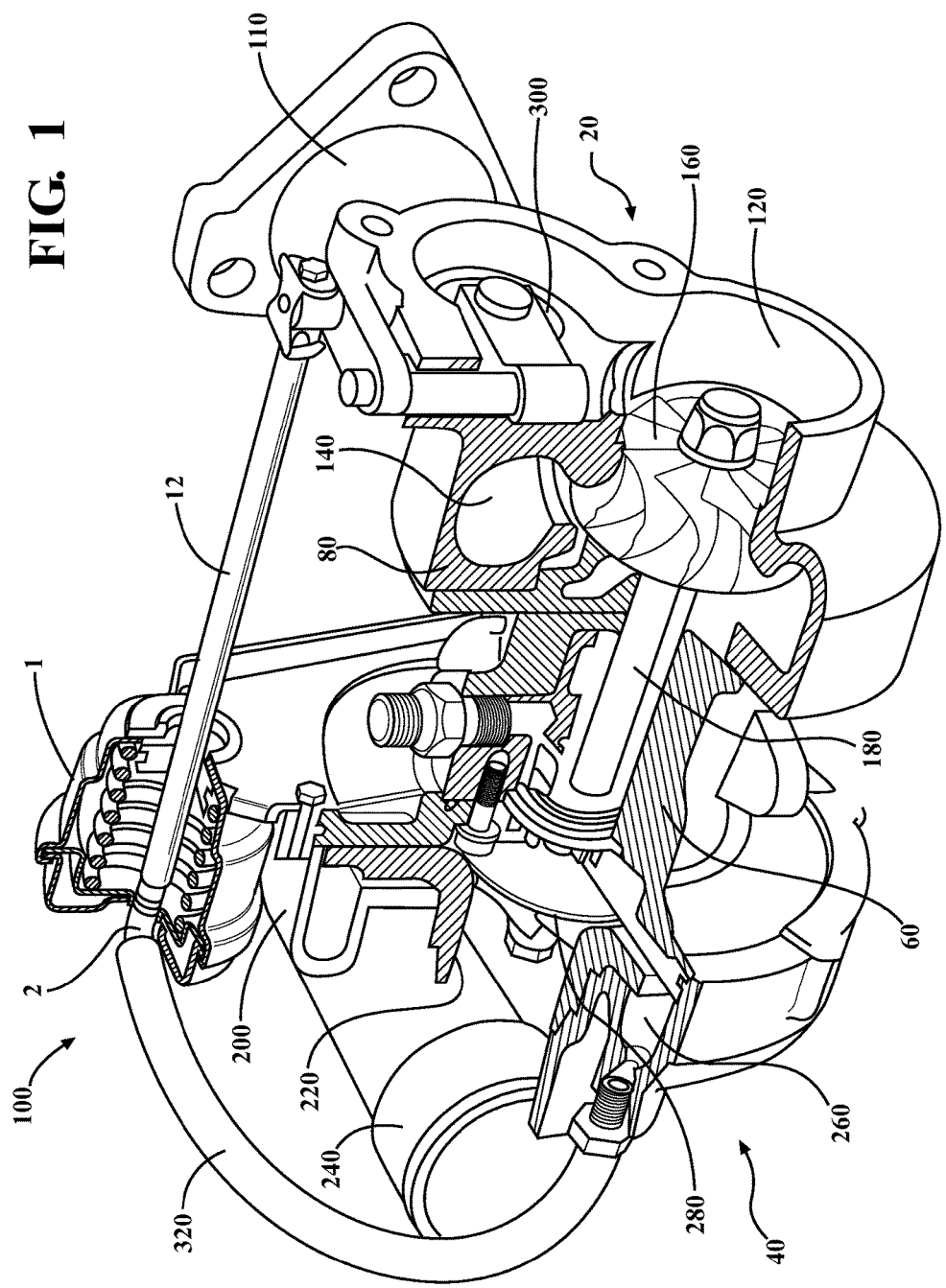
FIG. 1 is a partially-sectioned perspective view of an exhaust gas turbocharger including a wastegate valve connected to a pneumatic actuator.

Referring to FIG. 1, an exhaust gas turbocharger 100 includes a turbine section 20, a compressor section 40, and a bearing housing 60 disposed between and connecting the compressor section 40 to the turbine section 20. The turbine section 20 includes a turbine housing 80 that defines an exhaust gas inlet 110, an exhaust gas outlet 120, and a turbine volute 140 disposed in the fluid path between the exhaust gas inlet 110 and the exhaust gas outlet 120. A turbine wheel 160 is disposed in the turbine housing 80 between the turbine volute 140 and the exhaust gas outlet 120. A shaft 180 is connected to the turbine wheel 160, is rotatably supported within the bearing housing 60, and extends into the compressor section 40. The compressor section 40 includes a compressor housing 200 that defines an air inlet 220, an air outlet 240, and a compressor volute 260. A compressor wheel 280 is disposed in the compressor housing 200 between the air inlet 220 and the compressor volute 260. The compressor wheel 280 is connected to, and driven by, the shaft 180.

In use, the turbine wheel 160 is rotatably driven by an inflow of exhaust gas supplied from the exhaust manifold of an engine (not shown). Since the shaft 180 connects the turbine wheel 160 to the compressor wheel 280, the rotation of the turbine wheel 160 causes rotation of the compressor wheel 280. As the compressor wheel 280 rotates, it provides a pressure boost to the engine by increasing the air mass flow rate, airflow density and air pressure delivered to the engine's cylinders via an outflow from the compressor air outlet 240, which is connected to the engine's air intake manifold.

When the pressure of the exhaust gas is high, there may be more exhaust pressure than is required to provide the desired pressure boost. One solution for this problem is to divert exhaust gas away from the turbine wheel 160 during high exhaust gas pressure conditions, so that the amount of exhaust gas reaching the turbine wheel 160 is the quantity needed to provide optimum pressure boost. A wastegate valve 300 is used to divert exhaust gases away from the turbine wheel 160. Diversion of exhaust gases controls the turbine wheel rotational speed, which in turn controls the rotational speed of the compressor wheel 280. By controlling the rotational speed of the compressor wheel 280, the wastegate valve 300 is able to regulate the maximum boost pressure provided to the engine by the turbocharger 100.

The wastegate valve 300 is disposed on the turbine housing 80 upstream of the turbine wheel 160 and is actuated by a pneumatic actuator 1 that uses the turbocharger 100 as a source of pressurized fluid. For example, a portion of the pressurized air from the compressor section 40 is conducted to a fluid inlet 2 of the pneumatic actuator 1 via a line 320. When the compressor output pressure is high, the pneumatic actuator 1 opens the wastegate valve 300, whereby exhaust gas is diverted from the turbine wheel 160.

In some diesel engines, the actuator 1 is an electronically-controlled pneumatic actuator. The electronic system measures many operating parameters and calculates the most desirable pressure boost under the circumstances. If the electronic system determines that the wastegate valve 300 should be opened, it controls a high pressure air source available at the engine, such as the air used for air brakes, to create a lower pressure gas stream to operate the wastegate actuator 1. The high pressure air is at a far higher pressure than the actuator 1 is equipped to handle. A PWM (pulse width modulated) valve (not shown) may be used as part of a pressure reduction system to reduce the pressure of the air admitted to the actuator 1. The pressure delivered to the actuator 1 is controlled electronically to achieve the degree of wastegate opening which is desirable based upon the current operating parameters. With control based upon a large number of parameters, the electronically controlled turbocharger 100 provides more flexibility in controlling the way that the engine behaves under various conditions such as high load, idle, regeneration, and at high altitude. However, if the PWM valve fails, high pressure air can be supplied to the actuator 1, possibly causing it to rupture. If the actuator 1 ruptures, it could damage other engine components in the engine compartment. In addition, the rupture of the actuator 1 can be a safety hazard to anyone who is accessing the engine while it is running. For example, a failure of the PWM valve allowing high pressure air into the actuator 1 while a mechanic has the engine compartment open for maintenance purposes could result in serious injury.

Figure 2:
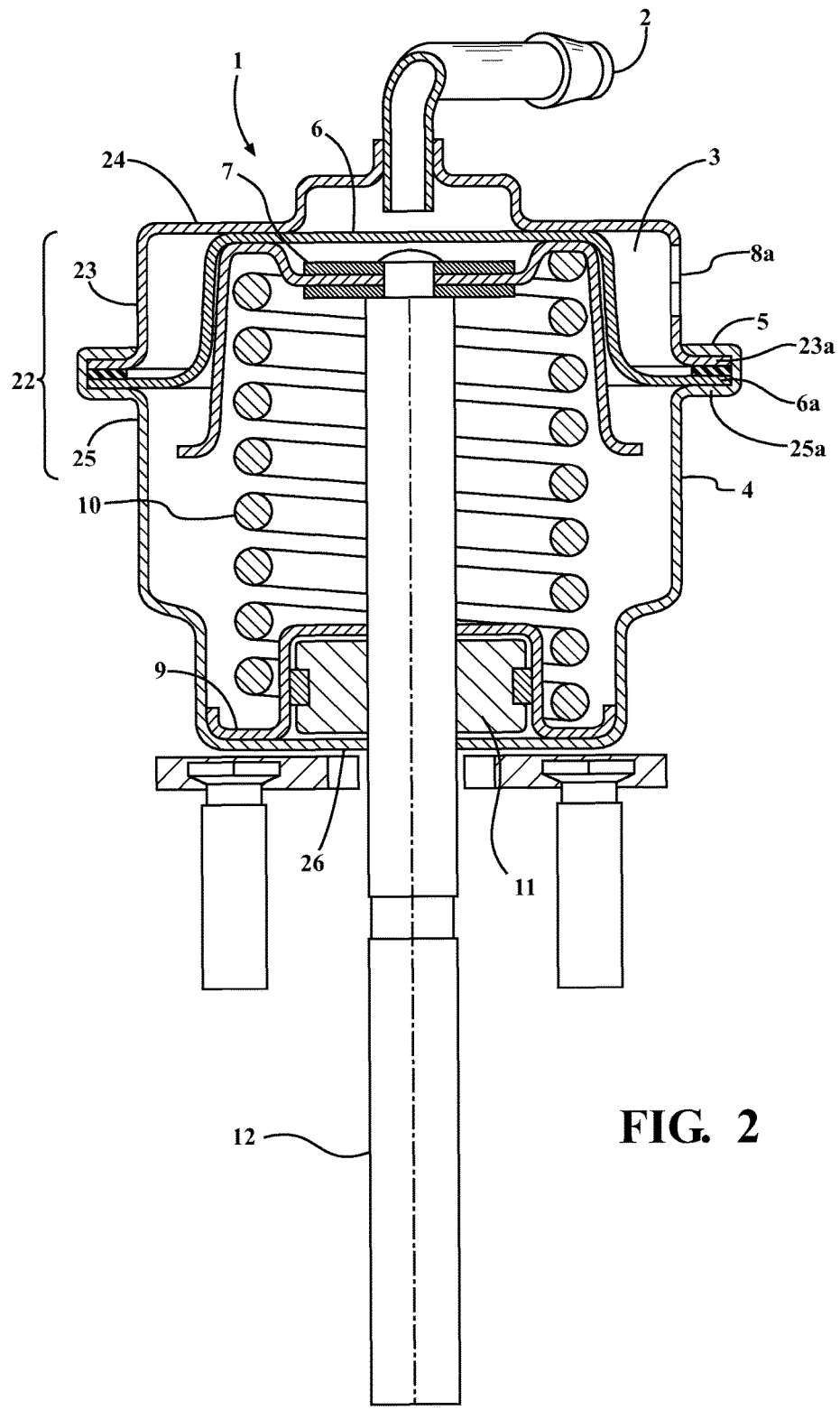
FIG. 2 is a cross-sectional view of the actuator of FIG. 1, in which a portion of the housing includes a pressure relief device in the form of a thin-wall region.

Referring to FIG. 2, the actuator 1 has a housing 22 that includes a first portion 23 at a first end 24 thereof, and a second portion 25 at a second end 26 thereof. The respective free ends 23a, 25a of the first portion 23 and the second portion 25 are joined together by a crimp 5. The actuator 1 includes a flexible, gas-impermeable diaphragm 6 disposed in the housing 22 in a manner such that a peripheral edge 6a of the diaphragm 6 is held by the crimp 5 so as to form a seal between the diaphragm 6 and the housing 22. A first, pressurized compartment 3 is defined between the housing first portion 23 and the diaphragm 6, and a second, atmospheric pressure compartment 4 is defined between the housing second portion 25 and the diaphragm 6.

A piston 7 resides in the second compartment 4. The piston 7 is urged toward the housing first end 24 via a spring 10 that extends between the piston 7 and the housing second end 26. The piston 7 is connected to the wastegate valve 300 by a rod 12 that extends out of the second portion 25 of the housing 22 through a bushing 11. The bushing 11 is secured to the housing second end 26 via a baseplate 9.

The housing first portion 23 includes the pressurized fluid inlet 2, through which the first compartment 3 receives pressurized air from the compressor section 40 via the line 320. Thus, the first compartment 3 includes air at a positive pressure, which is defined as being at a pressure greater than atmospheric pressure. The second compartment 4 is substantially at atmospheric pressure. The pressurized air in the first compartment 3 acts on the piston 7 via the diaphragm 6, and when it has sufficient pressure, the air pushes the piston 7 against the force of the spring 10 toward the housing second end 26. Due to its connection to the wastegate valve 300 via the rod 12, movement of the piston 7 toward the housing second end 26 results in movement of the wastegate valve 300 from a closed position to an open position. When the first compartment 3 is not at the sufficient pressure, the piston 7 is retracted toward the housing first end 24 due to the resilient properties of the spring 10. As the piston 7 moves toward the housing first end 24, the wastegate valve 300 moves from the open position to a closed position.

The pneumatic actuator 1 is single-acting, e.g., the piston 7 is advanced using pressurized fluid applied to one side of the piston 7 via the diaphragm 6, and the piston 7 is returned to a retracted position by the spring 10 which acts on the opposed side of the piston 7. This can be compared to a double-acting pneumatic actuator (not shown) in which a piston is advanced using pressurized fluid applied to one side of the piston, and is refracted using pressurized fluid applied to the opposed side of the piston (e.g., the spring is omitted).

The actuator 1 includes a feature for lessening the likelihood of damaging actuator rupture if high pressure air accidently gets sent to the actuator 1. In particular, the housing first portion 23, which surrounds the pressurized compartment 3, includes a pressure relief device 8a. The pressure relief device 8a is a wall portion that is thin relative to the remainder of the housing first portion 23. The thin wall pressure relief device 8a is configured to fail (e.g., form an opening) in a controlled manner when the pressurized compartment 3 reaches a predetermined pressure that is greater than the normal operating pressure of the actuator 1 and thus serves as a safety mechanism. In a plastic actuator, the relatively thin wall of the pressure relief device 8a could be created when the plastic part is molded. Alternatively, the relatively thin wall of the pressure relief device 8a may be machined in the plastic wall after the plastic actuator is molded. In a metal actuator, the relatively thin wall of the pressure relief device 8a could be created by machining the wall after the actuator is formed. In the illustrated embodiment, the thin wall pressure relief device 8a is disposed on a lateral side of the housing first portion 23, rather than on the housing first end 24, but is not limited to this location.

Figure 3:
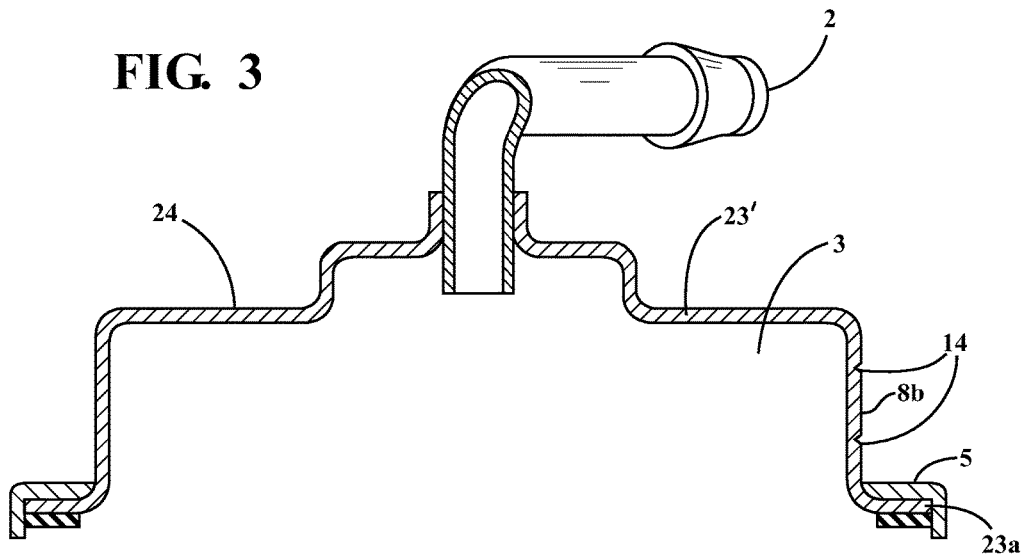
FIG. 3 is a cross-sectional view of a portion of another embodiment actuator in which the pressure relief device includes a portion of the housing that is surrounded by score marks.

Referring to FIG. 3, another embodiment actuator includes a housing first portion 23", which surrounds the pressurized compartment 3 and includes a pressure relief device 8b. The pressure relief device 8b is a wall portion that is surrounded by a series of score marks 14. The score marks 14 weaken the wall and are configured so that the pressure relief device 8b will fail in a controlled manner when the pressurized compartment 3 reaches a predetermined pressure that is greater than the normal operating pressure of the actuator 1, and thus serves as a safety mechanism. If the housing first portion 23' is formed of metal, the score marks 14 may be stamped or machined into the metal to weaken the pressure relief section. If the housing first portion 23' is formed of plastic, the score marks 14 may either be cut after the actuator 1 is molded or they may part of the mold. In the illustrated embodiment, the pressure relief device 8b is disposed on a lateral side of the housing first portion 23', rather than on the first end 24, but is not limited to this location.

Figure 4:
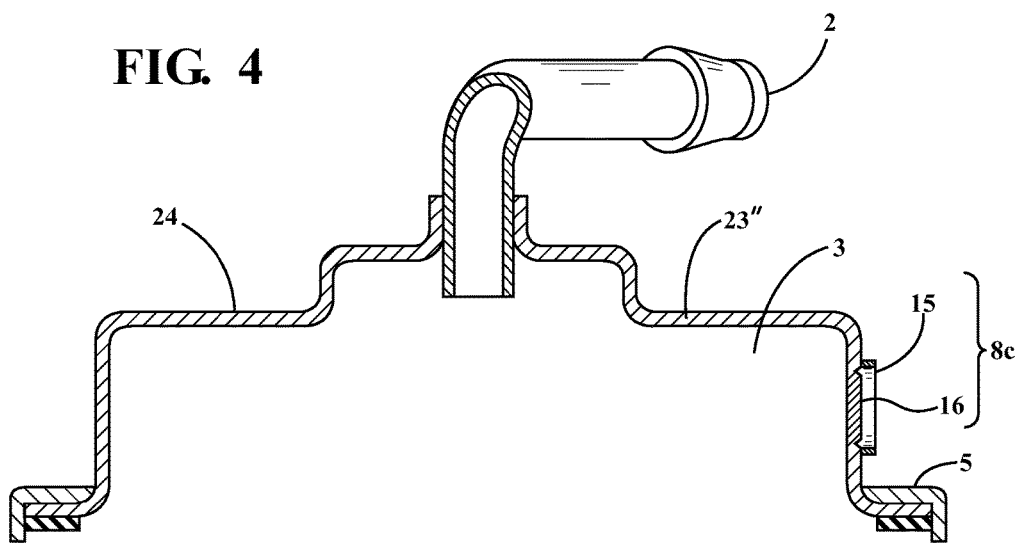
FIG. 4 is a cross-sectional view of a portion of another embodiment actuator in which the pressure relief device includes a portion of the housing that includes a rupture disc.

Referring to FIG. 4, another embodiment actuator includes a housing first portion 23", which surrounds the pressurized compartment 3 and includes a pressure relief device 8c. The pressure relief device 8c is a rupture disc 16 that is secured to the housing first portion 23" via a retaining ring 15. The rupture disc 16 is weak relative to the surrounding wall and is configured so that the pressure relief device 8c will fail in a controlled manner when the pressurized compartment 3 reaches a predetermined pressure that is greater than the normal operating pressure of the actuator 1, and thus serves as a safety mechanism. In the illustrated embodiment, the pressure relief device 8c is disposed on a lateral side of the housing first portion 23", rather than on the first end 24, but is not limited to this location.

Figure 5:
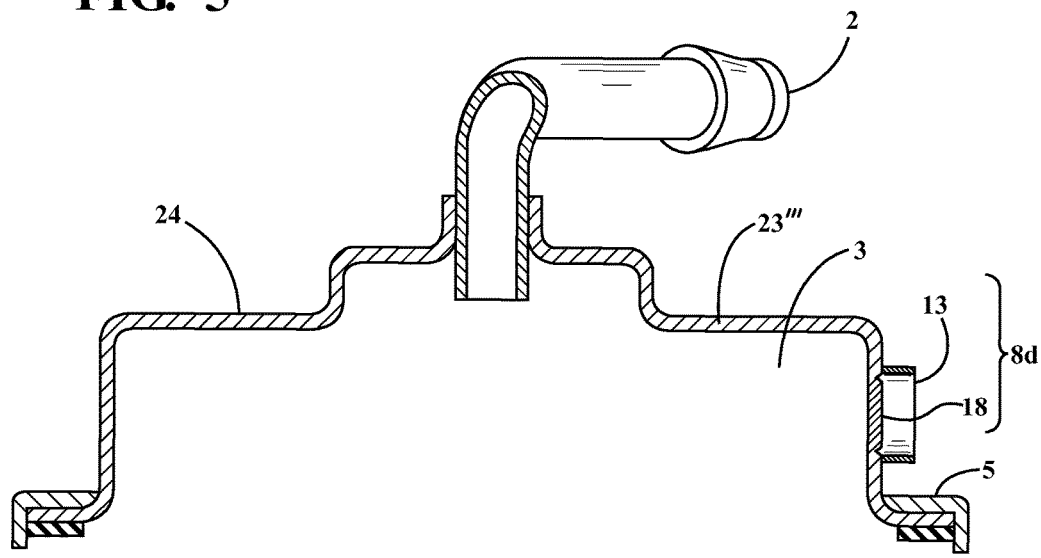
FIG. 5 is a cross-sectional view of a portion of another embodiment actuator in which the pressure relief device includes a portion of the housing that includes a rupture disc that is protected by a duct.

Referring to FIG. 5, another embodiment actuator includes a housing first portion 23", which surrounds the pressurized compartment 3 and includes a pressure relief device 8d. The pressure relief device 8d is a rupture disc 18 that is disposed in a duct 13. The duct 13 secures the rupture disc 18 to the housing first portion 23" and also serves to protect the rupture disc 18. The rupture disc 18 is weak relative to the surrounding wall and is configured so that the pressure relief device 8d will fail in a controlled manner when the pressurized compartment 3 reaches a predetermined pressure that is greater than the normal operating pressure of the actuator 1, and thus serves as a safety mechanism. In the illustrated embodiment, the pressure relief device 8d is disposed on a lateral side of the housing first portion 23''', rather than on the first end 24, but is not limited to this location.

The rupture disc 16, 18 has several advantages. The rupture discs 16, 18 are available in a wide variety of sizes and pressure release levels. The rupture discs 16, 18 are precise in their release point and release pressure very quickly. If the actuator is damaged by high pressure air, the rupture disc 16, 18 can be replaced and the actuator can continue to be used.

Figure 6:
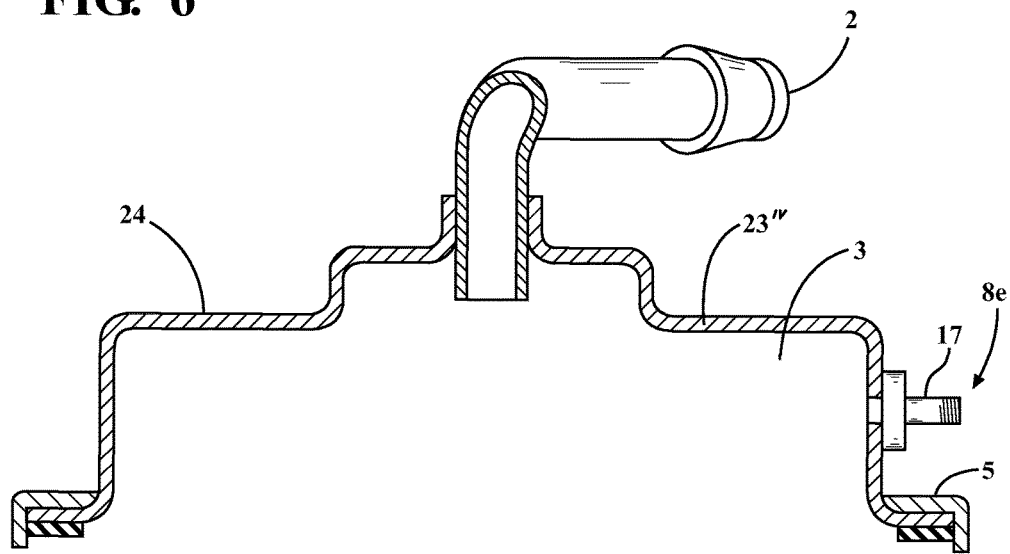
FIG. 6 is a cross-sectional view of a portion of another embodiment actuator in which the pressure relief device includes a pressure relief valve.

Referring to FIG. 6, another embodiment actuator includes a housing first portion $23^{iv}$, which surrounds the pressurized compartment 3 and includes a pressure relief device 8e. The pressure relief device 8e is a relief valve 17 that is secured to the housing first portion $23^{iv}$. The pressure relief valve 17 is configured to open in a controlled manner and release air from the pressurized compartment 3 when the pressurized compartment 3 reaches a predetermined pressure that is greater than the normal operating pressure of the actuator 1, and thus serves as a safety mechanism. Any pressure release valve 17 suitable for releasing gas pressure above a certain point may be used, including a spring loaded pressure release valve. In the illustrated embodiment, the pressure relief device 8e is disposed on a lateral side of the housing first portion $23^{iv}$, rather than on the first end 24, but is not limited to this location.

The actuator 1 including the pressure relief device 8a, 8b, 8c, 8d, 8e provides a means for lessening the likelihood of damaging actuator rupture, if high pressure air accidently gets sent to the actuator 1.

Although specialty metals such as hastelloy, inconel, incoloy, monel, invar, and kovar could be used in making the actuator housing 22, the actuator 1 is in an environment where temperatures of around 180° C. are expected and such high temperature metals are not generally required. A wide variety of metals such as aluminum, brass, or several grades of steel, stainless steel, steel sheet metal, and stainless steel sheet metal could be used to make the actuator 1 of the present invention. However, for reasons of cost and convenience, if the material for constructing the actuator 1 is metal, ordinary steel sheet metal, such as DC04, would generally be used. DC04 is a low carbon cold rolled flat steel which is suitable for cold working to form products. SAE1006 steel is equivalent to DC04.

Alternatively, the actuator housing 22 may be formed of various plastics, polymers or resins, referred to collectively as plastics. In order to function properly, the actuator housing 22 should be relatively rigid at temperatures in the range of 180° C. Accordingly, the actuator housing 22 should be made of a plastic which will perform well at such temperatures. Examples of such plastics include polyamide resins such as nylon, acrylonitrile butadiene styrene resins, polycarbonate resins, polyether ether ketone resins, polyetherimide resins, phenol formaldehyde resins such as Bakelite®, and urea formaldehyde resins.

Selected illustrative embodiments of the actuator are described above in some detail. It should be understood that only structures considered necessary for clarity have been described herein. Other conventional structures, and those of ancillary and auxiliary components of the system, are assumed to be known and understood by those skilled in the art. Moreover, while working examples of the actuator have been described above, the actuator is not limited to the working examples described above, but various design alterations may be carried out without departing from the present invention as set forth in the claims.

What is claimed, is:

1. A pneumatic actuator comprising:
   a housing having a wall, the housing including a housing first portion and a housing second portion;
   a fluid inlet formed in the housing first portion;
   a diaphragm disposed in the housing and extending between opposed faces of the housing;
   a piston disposed in the housing, the piston connected to the diaphragm, and
   a spring disposed in the housing and extending between the piston and the housing second portion, the spring being positioned for compression upon movement of the piston in a first direction,
   wherein a pressurized chamber is defined between the diaphragm and the housing first portion, and the housing first portion includes a pressure relief device configured and dimensioned to permit fluid flow therethrough such that fluid is communicated through the housing in a second direction transverse in relation to the first direction.

2. The pneumatic actuator of claim 1, wherein the pressure relief device comprises a weakened portion of the housing first portion.

3. The pneumatic actuator of claim 1, wherein the pressure relief device comprises a portion of the housing first portion that is weakened by score marks.

4. The pneumatic actuator of claim 1, wherein the pressure relief device comprises a portion of the housing first portion that is thin relative to the remainder of the housing first portion.

5. The pneumatic actuator of claim 1, wherein the pressure relief device comprises a portion of the housing first portion that includes a rupture disc.

6. The pneumatic actuator of claim 5, wherein the rupture disc is retained within the housing first portion by a retaining ring.

7. The pneumatic actuator of claim 5, wherein the rupture disc is surrounded by a protective duct.

8. The pneumatic actuator of claim 1, wherein the pressure relief device is a pressure relief valve.

9. The pneumatic actuator of claim 1, wherein the pressure relief device is formed of metal.

10. The pneumatic actuator of claim 9, wherein the metal is selected from the group consisting of aluminum, brass, steel, stainless steel, steel sheet metal, and stainless steel sheet metal.

11. The pneumatic actuator of claim 1, wherein the pressure relief device is formed of a plastic.

12. The pneumatic actuator of claim 11, wherein the plastic is selected from the group consisting of polyamide resins, acrylonitrile resins, butadiene styrene resins, polycarbonate resins, polyether ether ketone resins, polyetherimide resins, phenol formaldehyde resins, and urea formaldehyde resins.

13. A pneumatic actuator for use in a turbocharger including a turbine rotatable by exhaust gas to cause corresponding rotation of a compressor to compress incoming air, the actuator comprising:
a housing having a wall and opposing first and second ends;
a diaphragm positioned within the housing, the diaphragm and the housing cooperating to define a chamber configured and dimensioned to received fluid, wherein communication of fluid into the chamber causes displacement of the diaphragm;
a piston in mechanical cooperation with the diaphragm such that displacement of the diaphragm causes corresponding displacement of the piston along a first axis, the piston being in mechanical cooperation with a valve such that movement of the piston along the first axis repositions that valve to divert exhaust gas from the turbine; and
a pressure relief member associated with the wall of the housing, the pressure relief member being configured, dimensioned, and positioned to permit fluid flow therethrough when pressure within the chamber exceeds a threshold, the pressure relief member being positioned such that fluid flows passes through the pressure relief member and the wall of the housing in a second direction transverse in relation to the first direction.

14. The pneumatic actuator of claim 13, wherein the pressure relief member includes a weakened portion of the wall of the housing.

15. The pneumatic actuator of claim 14, wherein the weakened portion of the wall of the housing is thin relative to other portions of the wall of the housing.

16. The pneumatic actuator of claim 13, wherein the pressure relief member includes a rupture disc.

17. The pneumatic actuator of claim 16 further including a retaining ring to secure the rupture disc to the housing.

18. The pneumatic actuator of claim 16 further including a duct configured, dimensioned, and positioned to protect the rupture disc.

19. The pneumatic actuator of claim 18, wherein the rupture disc is positioned within the duct.

20. The pneumatic actuator of claim 18, wherein the duct is configured and dimensioned to secure the rupture disc to the housing.

* * * * *

UNITED STATES PATENT AND TRADEMARK OFFICE
CERTIFICATE OF CORRECTION

PATENT NO. : 10,077,711 B2
APPLICATION NO. : 14/898177
DATED : September 18, 2018
INVENTOR(S) : Andrew Day Page 1 of 1

It is certified that error appears in the above-identified patent and that said Letters Patent is hereby corrected as shown below:

In the Specification

In Column 5, Line 34, please delete "portion 23''" and insert -- portion 23''' --.

Signed and Sealed this
Thirteenth Day of November, 2018

Andrei Iancu
*Director of the United States Patent and Trademark Office*